April 15, 1930.  T. H. LEE  1,754,861
VEHICLE BRAKING APPARATUS
Filed July 10, 1928   4 Sheets-Sheet 4
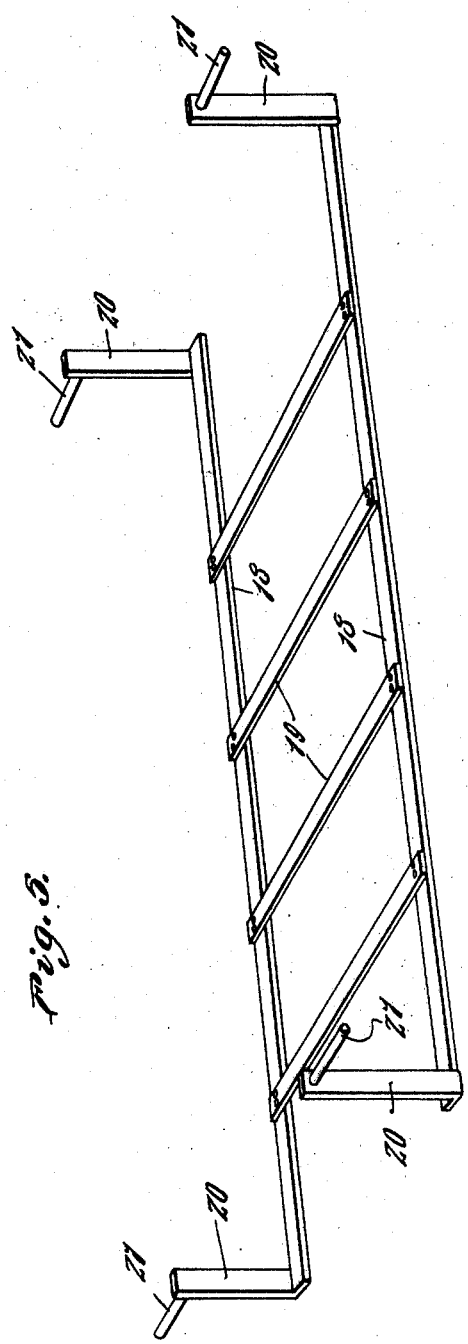
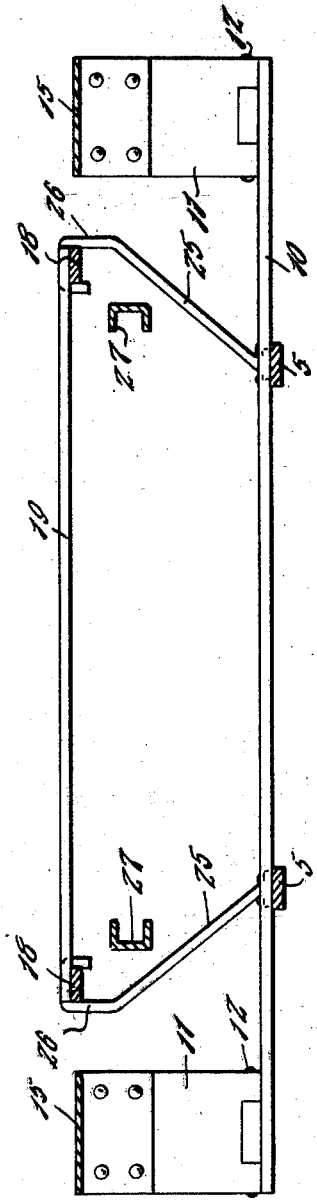
Inventor
Tay Hain Lee
By Clarence A. O'Brien
Attorney Patented Apr. 15, 1930

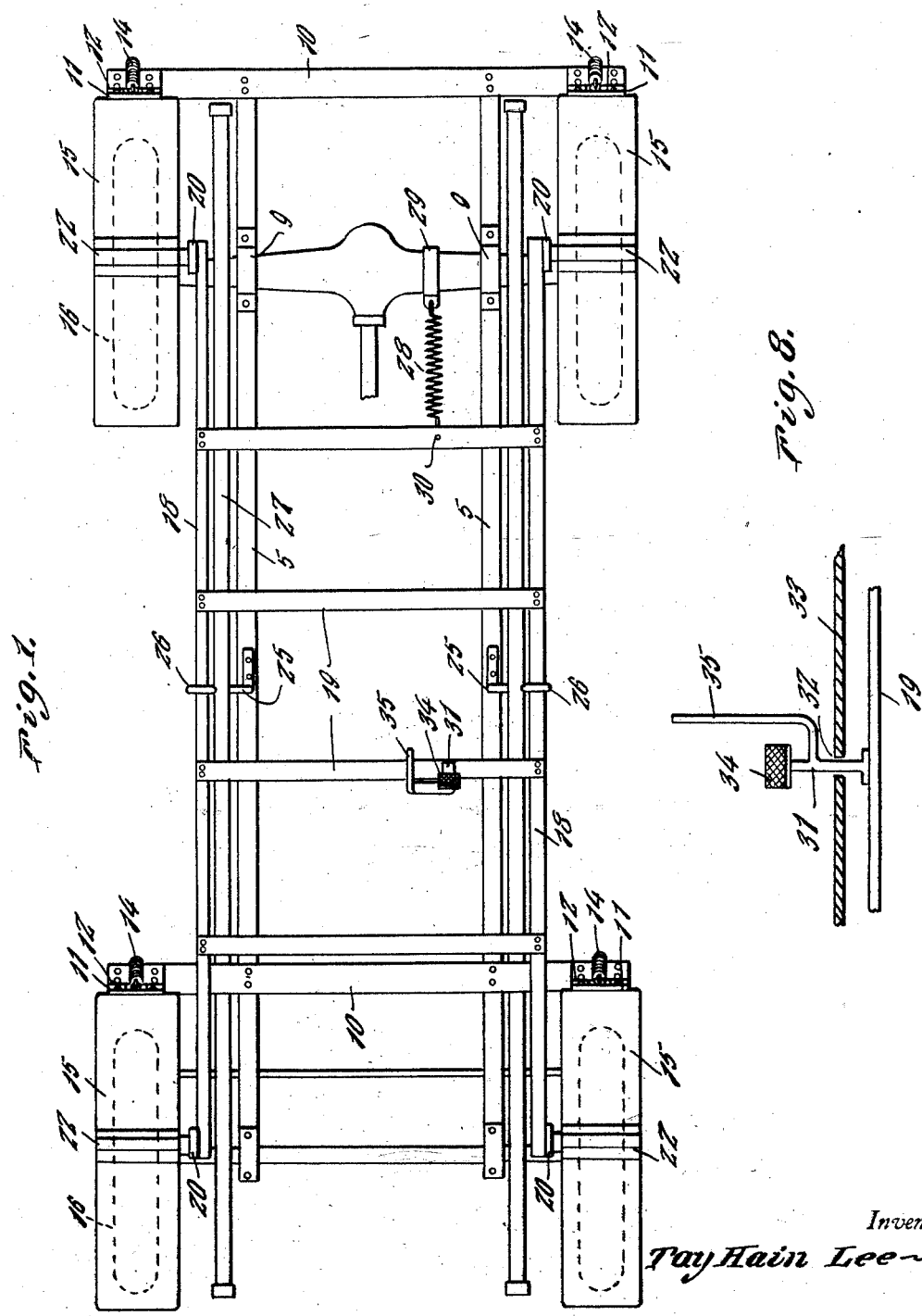

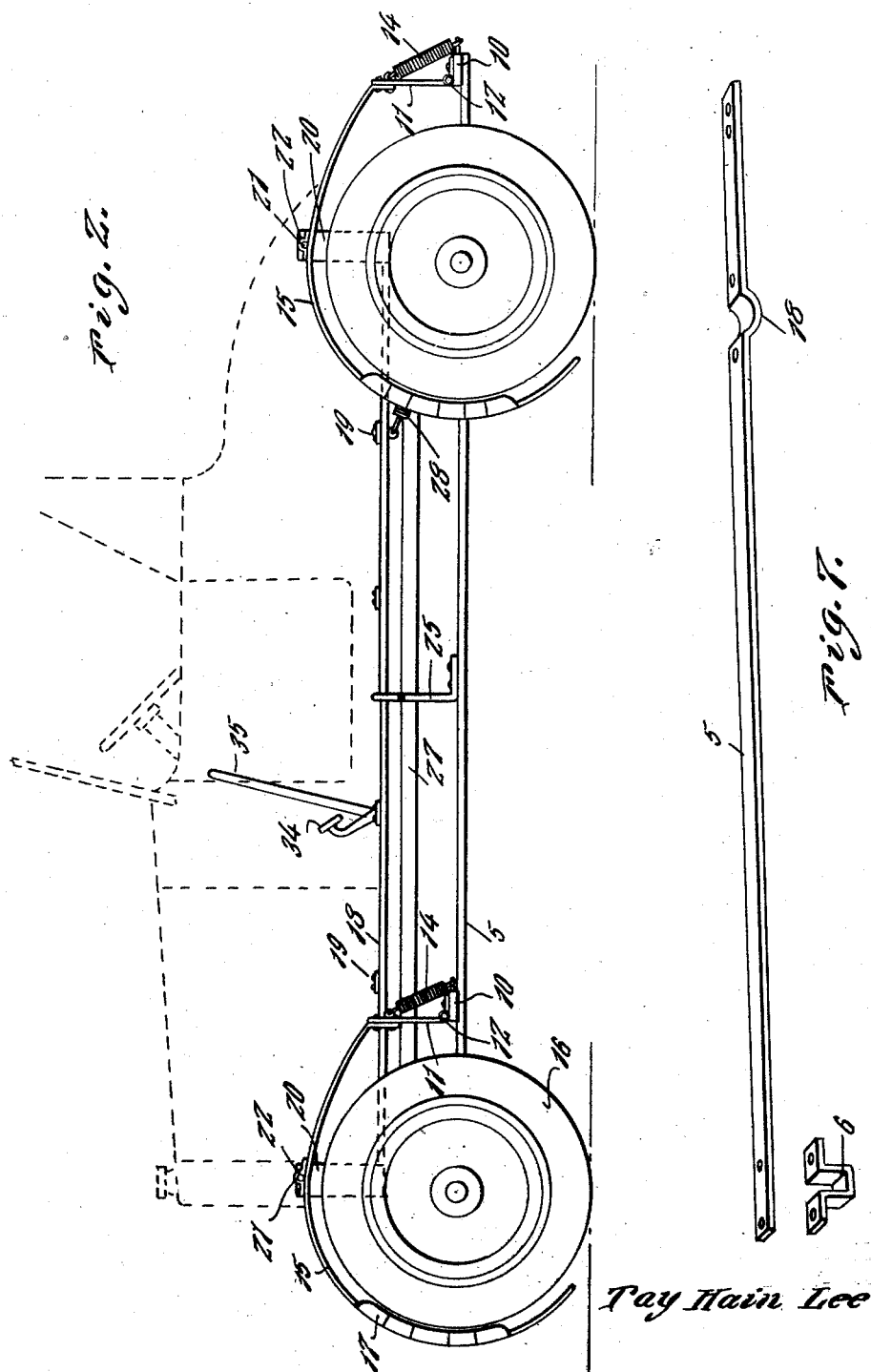

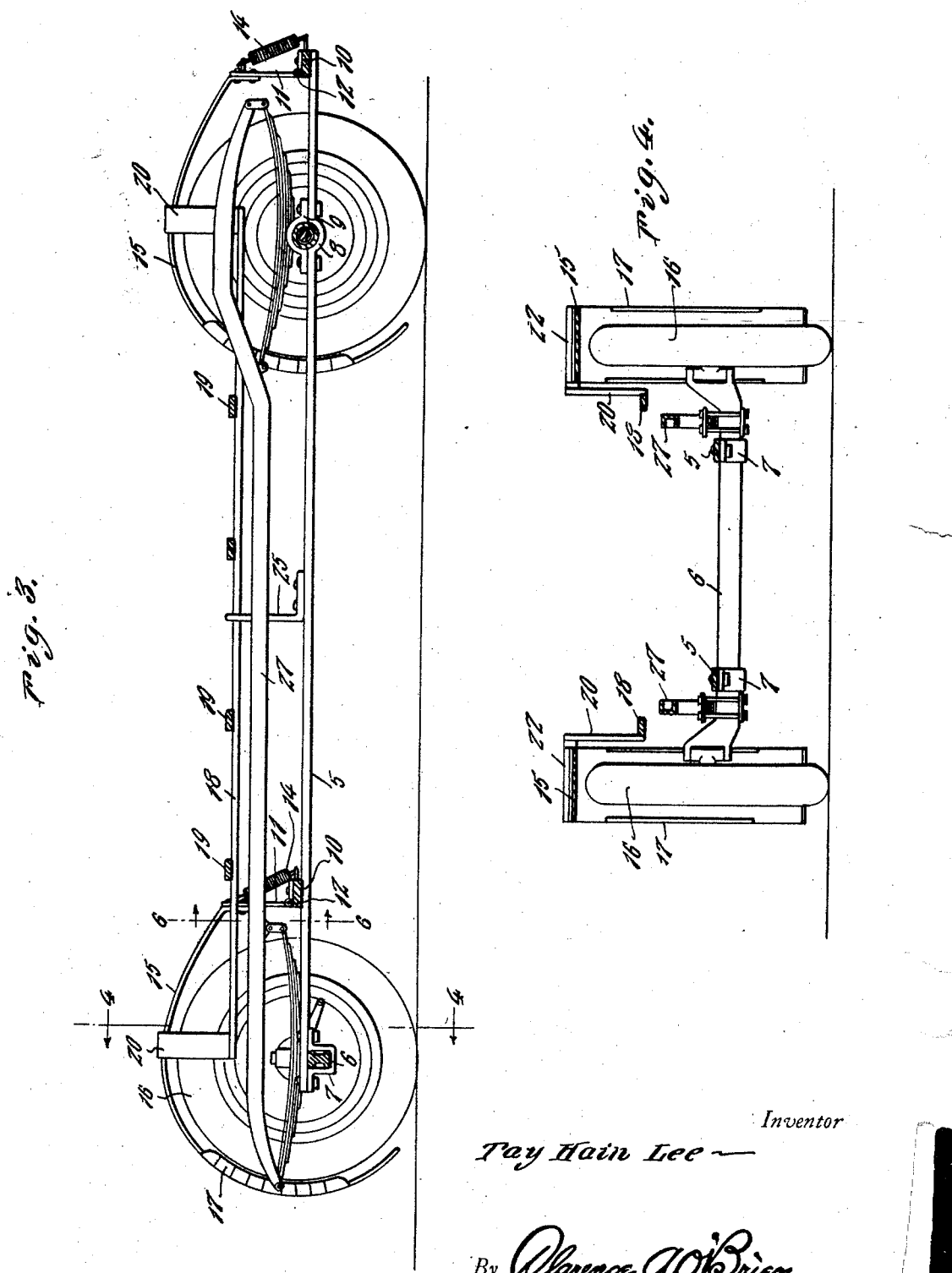

1,754,861

UNITED STATES PATENT OFFICE

TAY H. LEE, OF EVANSTON, ILLINOIS

VEHICLE BRAKING APPARATUS

Application filed July 10, 1928. Serial No. 291,611.

The present invention relates to a vehicle braking apparatus and has for its prime object to provide a structure which may be easily brought into play on a vehicle to almost instantaneously bring the vehicle to a stop in a safe and expeditious manner, without the necessity of expending any great amount of energy on the part of the operator.

Another very important object of the invention resides in the provision of an apparatus of this nature including a movable frame controlling a plurality of flexible strap-like checkers, which may be forced by movement of the frame, into engagement between the wheels and the ground to function as positive stops, thereby braking the speed of the vehicle in a safe and effective manner.

A still further very important object of the invention resides in the provision of an apparatus of this nature, which is comparatively simple in its construction, strong and durable, thoroughly efficient and reliable in use and operation, easy to manipulate, and otherwise well adapted to the purpose for which it is designed.

With the above and numerous other objects in view, as will appear as the description proceeds, the invention resides in certain novel features of construction, and in the combination and arrangement of parts as will be hereinafter more fully described and claimed.

In the drawings:

Figure 1 is a top plan view of the vehicle chassis, showing my improved apparatus mounted thereon.

Figure 2 is a side elevation thereof.

Figure 3 is a longitudinal vertical section therethrough.

Figure 4 is a vertical transverse section therethrough, taken substantially on the line 4—4 of Figure 3, Figure 5 is a perspective view of the movable frame.

Figure 6 is a vertical transverse section taken substantially on the line 6—6 of Figure 3.

Figure 7 is a perspective view of one of the supporting bars.

Figure 8 is a detail section showing the operating combination pedal and hand lever.

Referring to the drawings in detail, it will be seen that the numerals 5 denote two longitudinally extending supporting bars, which in the present instance rest at their forward ends on the front axle 6 and are held in place by suitable means 7, and these bars curve under the rear axle assembly as at 8 and are clamped thereto as at 9 and extend rearwardly.

Cross bars 10 are mounted on the bars 5, one to the rear of the front axle and one to the rear of the rear axle. Plates 11 are hingedly engaged as at 12, with the ends of the cross bars 10 and rise therefrom and are urged rearwardly by means of springs 14, secured to the cross bars 10 and to the upper ends of the plates 11. Curved flexible strap-like checkers 15 are fixed to the upper ends of the plates 11 and extend upwardly and forwardly over wheels 16 and then downwardly in front of the wheels to terminate normally a distance above the ground. Adjacent the forward portion of the wheels 16, the checkers are provided with side sectional flanges 17.

A movable frame comprises a pair of longitudinal members 18, held in spaced parallel relation and co-extensive by means of cross braces 19. These longitudinal members 18 are provided at their ends with upwardly directed arms 20, having laterally and outwardly extending pintles 21 receivable in bearing members 22, on intermediate portions of the checkers 15. Guides 25 rise from intermediate portions of the bars 5, between the front and rear axles and rearwardly of the front cross bars 10 and diverge upwardly from each other and merge into inverted U-shaped portions 26, for receiving the longitudinal members 18 of the movable frame.

The chassis of the vehicle is indicated at 27 and is located below the movable frame, but above the bars 5 and 10. The guides extend to the outer sides of the sides of the chassis. The movable frame is held in a rearward position by means of the spring 28, anchored as at 29, on the rear axle assembly and to the rearmost cross member 19, as at 30. A shank 31 rises from the second from the front cross member 19, through a slot 32, in the floor board 33, and has a foot plate 34, on the upper end thereof. A lever 35 extends laterally from an intermediate portion of the shank above the floor board 33, and then upwardly.

From the above detailed description, it will be seen that the shank 31 and the movable frame may be urged forwardly, either by foot power or by hand, and when moved forwardly, the frame causes the rocking of the plates 11 forwardly, and thereby swing the checkers forwardly and downwardly to engage with the ground and then under the wheels, thus positively preventing the rotation of the wheels and causing a sliding until the vehicle comes to a dead stop, and this sliding strain is on the checkers rather than on the tires of the wheel. Thus skidding is prevented, and a quick and safe stop is effected.

It is thought that the construction, operation, utility and advantages of the invention will now be clearly understood by those skilled in this art, without a more detailed description thereof.

The present embodiment of the invention has been disclosed in detail, merely for the purpose of exemplification, since in actual practice, it attains the features of advantage enumerated as desirable, in the statement of the invention and the above description.

It will be apparent that changes in the details of construction, and in the combination and arrangement of parts may be resorted to, without departing from the spirit or scope of the invention or sacrificing any of its advantages.

Having thus described my invention, what I claim as new is:

1. An apparatus of the class described, including a stationary frame structure, means for mounting the frame structure on a vehicle, a movable frame structure, a plurality of flexible strap like checkers, one for each wheel of the vehicle, means for hingedly engaging the checkers with the stationary frame, a movable frame, means engaging the movable frame with intermediate portions of the checkers, spring means associated with the checkers holding them normally in a predetermined position, spring means associated with the movable frame holding it in a normal predetermined position.

2. An apparatus of the class described comprising a pair of longitudinal bars, means for fixing the bars to the axles of a vehicle, cross bars on the first mentioned bars, plates hinged to the cross bars, springs engaged with the plate and the crossbars to hold the plates in a normal predetermined position, a plurality of strap like flexible checkers engaged with the upper ends of the plates and curved over the wheels of the vehicle, a movable frame having rising arms provided with pintles, and means engaging the pintles with intermediate portions of the checkers.

3. An apparatus of the class described comprising a pair of longitudinal bars, means for fixing the bars to the axles of a vehicle, cross bars on the first mentioned bars, plates hinged to the cross bars, springs engaged with the plates and the cross bars to hold the plates in a normal predetermined position, a plurality of strap like flexible checkers engaged with the upper ends of the plates and curved over the wheels of the vehicle, a movable frame having rising arms provided with pintles, means engaging the pintles with intermediate portions of the checkers, means for holding the movable frame in a predetermined position.

4. An apparatus of the class described comprising a pair of longitudinal bars, means for fixing the bars to the axles of a vehicle, cross bars on the first mentioned bars, plates hinged to the cross bars, spring engaged with the plates and the cross bars to hold the plates in a normal predetermined position, a plurality of strap like flexible checkers engaged with the upper ends of the plates and curved over the wheels of the vehicle, a movable frame having rising arms provided with pintles, means engaging the pintles with intermediate portion of the checkers, means for holding the movable frame in a predetermined position, means whereby the frame may be moved forwardly either by foot power or hand power.

5. An apparatus of the class described comprising a pair of longitudinal bars, means for fixing the bars to the axles of a vehicle, cross bars on the first mentioned bars, plates hinged to the cross bars, springs engaged with the plates and the cross bars to hold the plates in a normal predetermined position, a plurality of strap like flexible checkers engaged with the upper ends of the plates and curved over the wheels of the vehicle, a movable frame having rising arms provided with pintles, means engaging the pintles with intermediate portions of the checkers, means for holding the movable frame in predetermined position, means whereby the frame may be moved forwardly either by foot power or hand power, guides rising from the first mentioned bars and guiding the movement of the movable frame.

In testimony whereof I affix my signature.

TAY H. LEE.